United States Patent
Klemen

(10) Patent No.: US 11,718,395 B2
(45) Date of Patent: Aug. 8, 2023

(54) ELECTRICALLY CONTROLLED VERTICAL TAKEOFF AND LANDING AIRCRAFT SYSTEM AND METHOD

(71) Applicant: Rolls-Royce Corporation, Indianapolis, IN (US)

(72) Inventor: Donald Klemen, Carmel, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 659 days.

(21) Appl. No.: 16/570,590

(22) Filed: Sep. 13, 2019

(65) Prior Publication Data
US 2021/0078700 A1  Mar. 18, 2021

(51) Int. Cl.
| | | |
|---|---|---|
| *B64C 29/00* | (2006.01) | |
| *B64D 27/24* | (2006.01) | |
| *B60L 50/60* | (2019.01) | |
| *B60L 53/20* | (2019.01) | |
| *B64D 35/04* | (2006.01) | |
| *B64D 35/02* | (2006.01) | |
| *B60L 50/15* | (2019.01) | |
| *B64D 27/02* | (2006.01) | |
| *H02J 7/16* | (2006.01) | |

(52) U.S. Cl.
CPC .......... *B64C 29/0025* (2013.01); *B60L 50/15* (2019.02); *B60L 50/60* (2019.02); *B60L 53/20* (2019.02); *B64D 27/24* (2013.01); *B64D 35/02* (2013.01); *B64D 35/04* (2013.01); *B60L 2200/10* (2013.01); *B64D 2027/026* (2013.01); *H02J 7/16* (2013.01); *H02J 2207/20* (2020.01)

(58) Field of Classification Search
CPC ..... B64C 29/00; B64C 29/0025; B64D 27/14; B64D 27/24; B64D 35/02; B64D 35/04; B64D 2027/026; B60L 53/20; B60L 50/60; B60L 50/15; H02J 2207/20; B64L 2200/10

See application file for complete search history.

(56) References Cited

U.S. PATENT DOCUMENTS

| | | |
|---|---|---|
| 3,136,499 A | 6/1964 | Kessler |
| 5,823,468 A | 10/1998 | Bothe |
| 6,293,491 B1 | 9/2001 | Wobben |
| 6,918,244 B2 | 7/2005 | Dickau |
| 8,469,306 B2 | 6/2013 | Kuhn, Jr. |
| 8,720,814 B2 | 5/2014 | Smith |
| 8,757,542 B2 | 6/2014 | Hopdjanian et al. |

(Continued)

FOREIGN PATENT DOCUMENTS

| | | | |
|---|---|---|---|
| CN | 108082500 | * | 5/2018 |
| WO | WO 2015/073084 | | 5/2015 |

*Primary Examiner* — Philip J Bonzell
*Assistant Examiner* — Ashesh Dangol
(74) *Attorney, Agent, or Firm* — Shumaker & Sieffert, P.A.

(57) ABSTRACT

A vertical takeoff and landing aircraft system includes a gas turbine engine coupled to a variable pitch propeller. The gas turbine engine is also coupled to a power split device including a first motor generator, a second motor generator, and a planetary module therebetween. The planetary module includes a sun gear, a ring gear, and a planet carrier. The motor generators are coupled to inverters, a DC bus and a battery. The battery is configured to power balance fans disposed on wings and horizontal stabilizers of the aircraft system. The balance fans can be closed off after vertical lift has been achieved.

18 Claims, 15 Drawing Sheets

(56) References Cited

U.S. PATENT DOCUMENTS

| | | |
|---|---|---|
| 9,702,254 B2 | 7/2017 | Saiz |
| 9,714,090 B2 | 7/2017 | Frolov et al. |
| 2006/0192046 A1* | 8/2006 | Heath .................... B64D 35/04 244/12.3 |
| 2011/0281679 A1 | 11/2011 | Larrabee et al. |
| 2012/0280091 A1 | 11/2012 | Saiz |
| 2013/0062455 A1 | 3/2013 | Lugg et al. |
| 2019/0047717 A1* | 2/2019 | Murrow ................ B64D 33/04 |

* cited by examiner

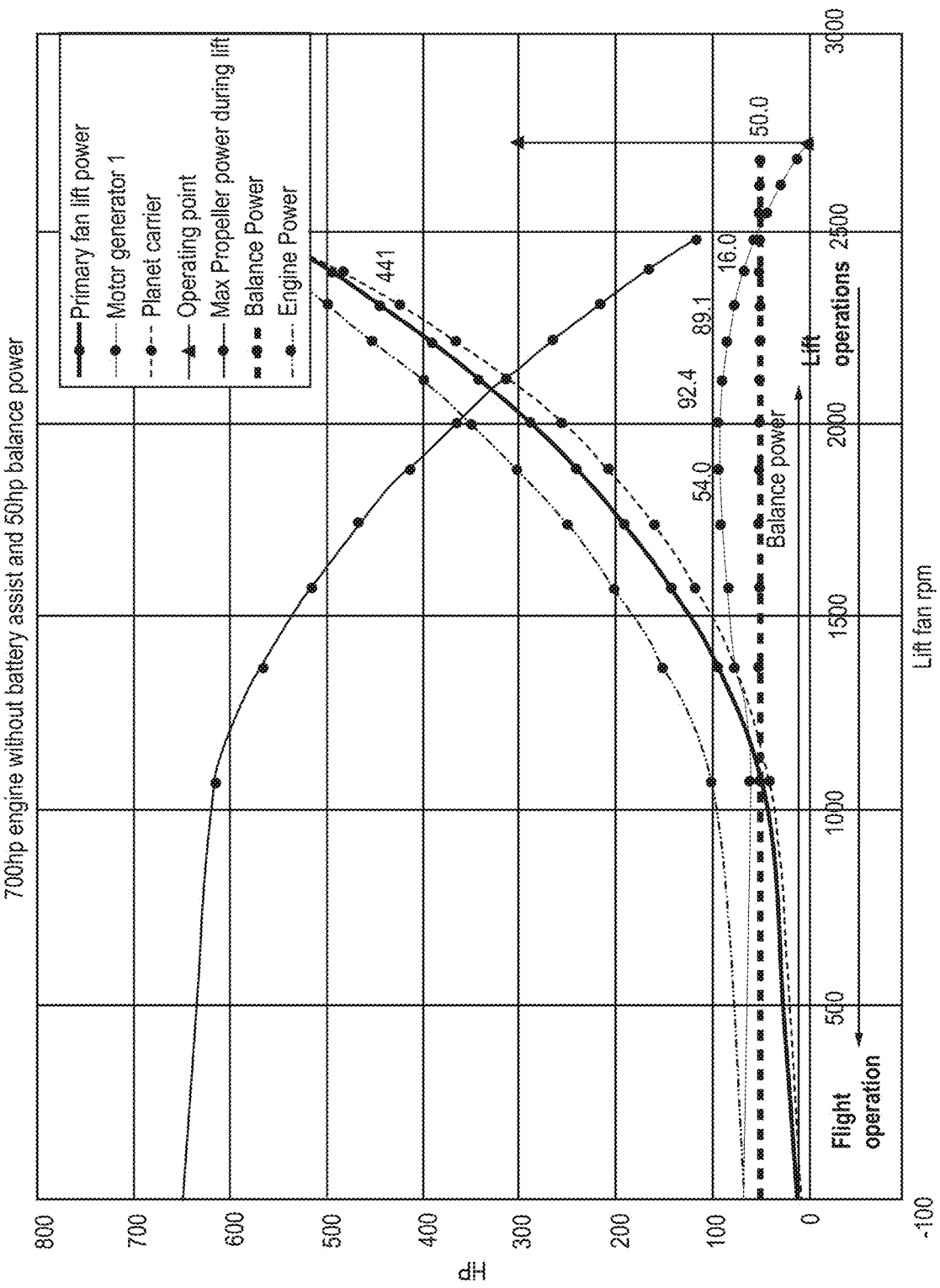

ELECTRICALLY CONTROLLED VERTICAL TAKEOFF AND LANDING AIRCRAFT SYSTEM AND METHOD

FIELD OF DISCLOSURE

The present subject matter relates generally to hybrid engine systems in vertical takeoff and landing aircraft.

BACKGROUND

Aircraft vertical takeoff and landing systems have been designed many times over the years using engine exhaust vectoring, mechanically clutched fans such as the Lockheed Martin F-35 Lightning, fully electric drone technology with four electrically driven fans, and systems such as Aurora VX-24 using multiple fans in duct technology. These systems may result in both excessive weight and excessive motor size, which both negatively impact power consumption by the aircraft during normal flight. Short takeoff and vertical landing F-35-type systems may be extremely expensive for light aircraft applications such as personal or two to three person taxi travel. Exhaust vectoring may suffer from major thermal issues and balance difficulty. Drone quad fan technology may suffer from low efficiency and large size and weight of the motors when scaled up for flight aircraft. The battery-powered lift systems can also be expensive, further raising the weight and impacting flight fuel consumption.

SUMMARY

According to one aspect, a vertical takeoff and landing aircraft system is provided having a fuselage, a plurality of wings, a variable pitch propeller, a power split device, and a plurality of balance fans. The fuselage comprises a gas turbine engine having a compressor, a combustor, a turbine, and two output shafts. The plurality of wings extend outwardly from the fuselage. The variable pitch propeller is coupled to the first output shaft of the gas turbine engine. The power split device is coupled to the second output shaft of the gas turbine engine and includes a planetary module, a first motor generator, and a second motor generator.

According to a further aspect, a method of operating a vertical takeoff and landing aircraft system is provided by running a gas turbine engine in which the gas turbine engine is disposed in a fuselage of the aircraft system, and a plurality of wings extend outwardly from the fuselage. The steps of operating a variable pitch propeller coupled to an output shaft of the gas turbine engine and operating a power split device coupled to the gas turbine engine are performed. The power split device has a first motor generator, a second motor generator, and a planetary module. A primary lift fan coupled an output shaft of the power split device is operated to lift the aircraft system vertically.

According to yet another aspect, an aircraft system having a fuselage, a variable pitch propeller, a power split device, a primary lift fan, and a plurality of balance fans is provided. The fuselage comprises a single core gas turbine engine, two wings extending outwardly from the fuselage, and a tail section comprising horizontal stabilizers. The variable pitch propeller is coupled to an output shaft of the single core gas turbine engine. The power split device is coupled to the single core gas turbine engine and includes a primary motor generator, a secondary motor generator, and a planetary module therebetween. The primary lift fan is configured to lift the aircraft system vertically.

Other aspects and advantages will become apparent upon consideration of the following detailed description and the attached drawings wherein like numerals designate like structures throughout the specification.

BRIEF DESCRIPTION OF THE DRAWINGS

FIGS. 7A and 7B are example graphical representations of power distribution of the aircraft lift system components having different sized control motors;

DETAILED DESCRIPTION

Figure 1:
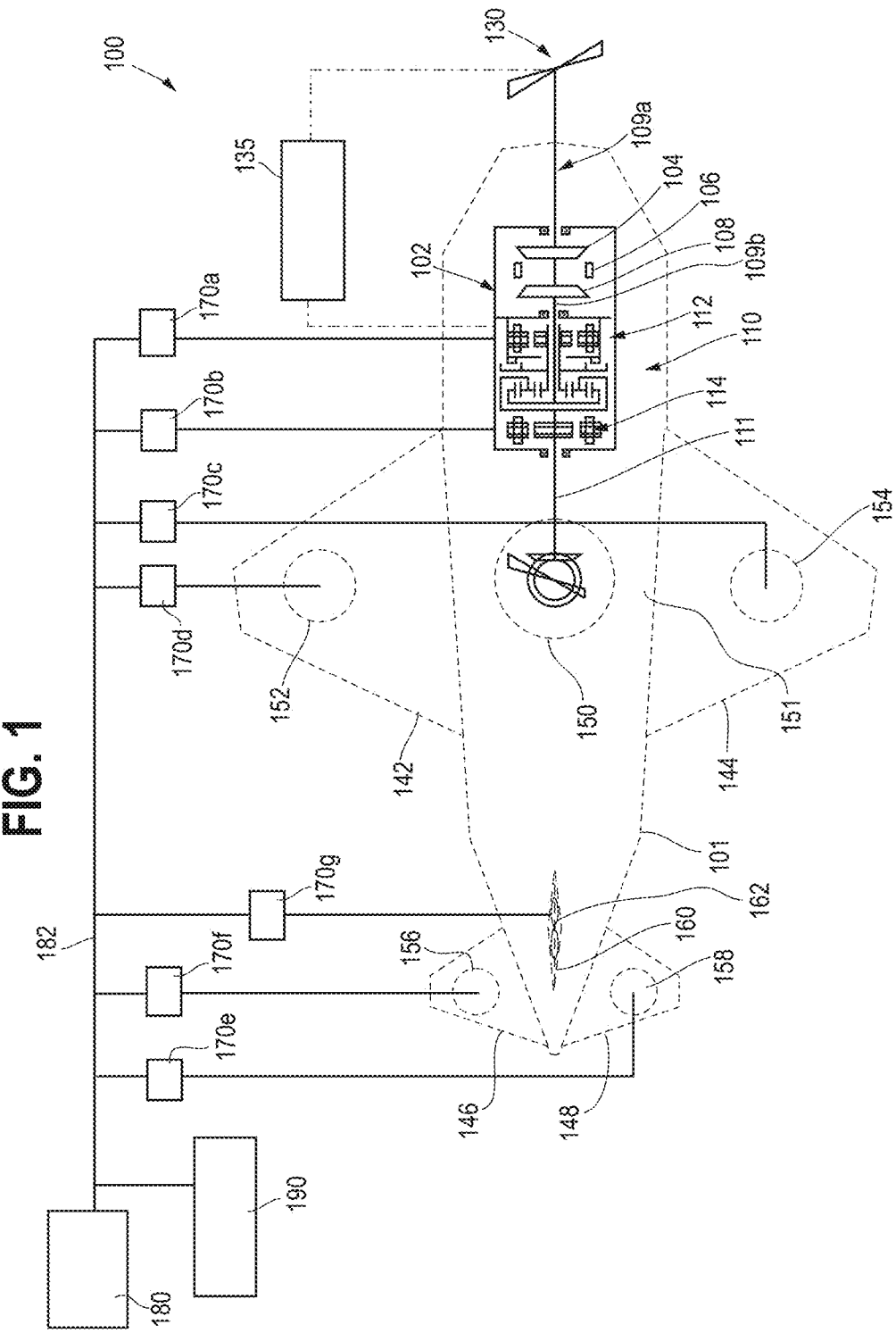
FIG. 1 is an illustration of a vertical takeoff and landing aircraft system.

For the purposes of promoting an understanding of the principles of the disclosure, reference will now be made to a number of illustrative embodiments in the drawings and specific language will be used to describe the same.

The vertical takeoff and landing aircraft system described herein include a hybrid power system, which provides vertical lift to existing engine architectures with significant reductions in weight. The vertical takeoff and landing aircraft system employs a gas turbine engine and a power split device, controlled by electric motor generators, to efficiently transmit both mechanical and electrical power from the gas turbine engine to a lift system comprising a plurality of fans. The vertical takeoff and landing aircraft system employs parallel power flow allowing the system to operate without expensive batteries. The system may also reduce motor size by as much as 10×, reduce heat generation by as much as 4×, and improve efficiency by as much as 12% during lift when compared to a conventional, series power flow, electronic system. This system also maintains high efficiency during flight.

The illustrated embodiment of the vertical takeoff and landing aircraft system 100 shown in FIG. 1 is a light aircraft having a fuselage 101, a gas turbine engine 102, and a variable pitch propeller 130. The fuselage 101 has two wings 142, 144 extending outwardly therefrom and a tail section comprising horizontal stabilizers 146, 148 and a vertical stabilizer 160.

The gas turbine engine comprises a compressor 104, a combustion chamber 106, and a turbine 108. The first output shaft 109a of the gas turbine engine 102 is coupled to the variable pitch propeller 130, and a second output shaft 109b is coupled to a power split device 110. An output shaft 111 of the power split device 110 is coupled to a primary lift fan 150. A first motor generator 112 and second motor generator 114 of the power split device 110 are each coupled to a planetary module 116 disposed therebetween (FIG. 2). The first motor generator 112 is coupled to a first inverter 170a and the second motor generator 114 is coupled to a second inverter 170b. The first and second inverters 170a, 170b are coupled to a DC bus 182 which allows electrical energy to be (1) routed to the balance fans 152, 154, 156, 158 (via inverters 170c-170f), (2) stored in a battery 180, or (3) used as needed to meet auxiliary power 190 requirements.

Utilizing the electric motor generators 112, 114 in the system, a plurality of small balance fans 152, 154, 156, 158 disposed on the wings 142, 144 and horizontal stabilizers 146, 148 are configured to be closed via louvers (not shown) after vertical lift has been achieved and once forward motion and wing lift dominate, much as conventional wing extensions are retracted. A lateral balance fan 162 disposed in the vertical stabilizer 160 is provided in the illustrated embodiment to enable maneuverability. The lateral balance fan 162 is powered by the DC bus 182 via an inverter 170g.

The pitch of the variable pitch propeller 130 blades and the and the electrical power generated by the power split device 110 are controlled by the control system 135. The power for these balance fans 152, 154, 156, 158 can be provided from the electric motor generators 112, 114 of the parallel power split fan control system 135. The electrically variable system can also accept or deliver power to an energy storage system. Also, the stored power in the battery 180 can be used to provide aircraft auxiliary power 190 to assist lift or aircraft loads. The system is shown with a single core engine but is not restricted to a specific engine configuration.

Power may be increased to the primary control unit (i.e., the first motor generator 112) allowing faster lift if necessary. Lift however is not recoverable energy, and therefore, the aircraft system is primarily focused on providing lift from the gas turbine engine 102 to maximize fuel economy and reduce battery requirements.

Figure 15:
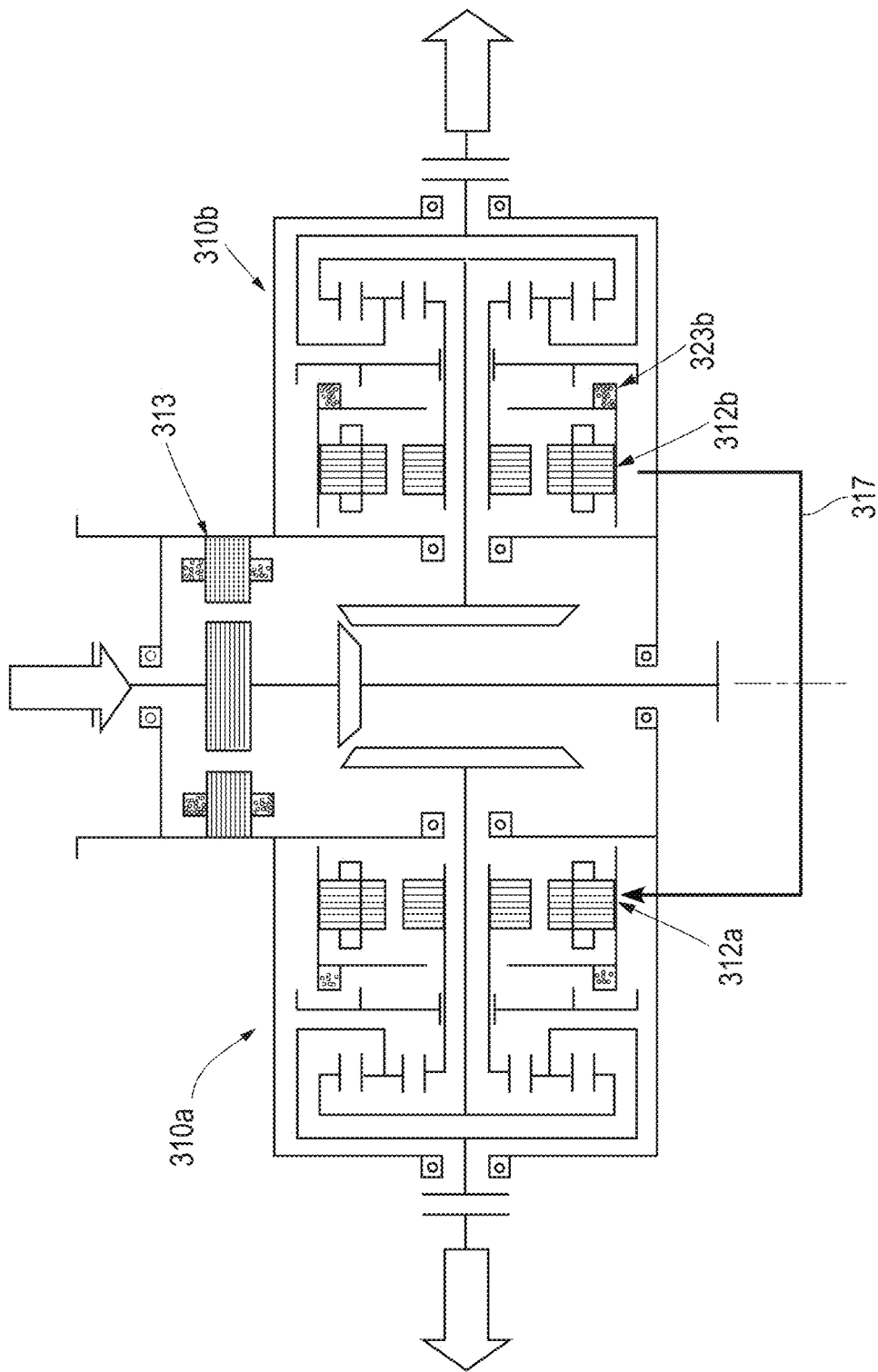
FIG. 15 is a detailed view of rear control motors of an embodiment of the vertical takeoff and landing aircraft system having a quad lift fan architecture illustrating power transfer during balance control.

The vertical takeoff and landing aircraft system 100 is electrically variable and focused on redundancy. A motor generator or inverter single point failure is not desired, but can be accommodated by control power transfer from one motor generator to another as seen in FIG. 15. The aircraft system uses a hybrid power system that is electrically variable having multiple modes of operation which can be sized to assist soft emergency landing. The vertical takeoff and landing aircraft system is designed to be integrated with existing gas turbine engines, fans and variable pitch propellers for efficient lift and provide a conventional landing option.

The aircraft system is not limited to vertical lift. As will be shown, the system is well-suited for small aircraft and provides a unique and efficient means of providing vertical lift. Also, embodiments of the aircraft system provide excellent efficiency in quad high power applications. The aircraft system provides redistribution of power between motor generators with low heat losses resulting in improved efficiency during flight.

Light Aircraft System

As noted, the vertical takeoff and landing aircraft system 100 shown in FIG. 1 includes a hybrid power system. The aircraft system 100 provides a minimum component weight and provides the builder of the airframe a simple system for integration. As stated above, the system in the illustrated embodiment has a primary lift fan 150 that is electrically variable, a plurality of balance fans 152, 154, 156, 158, and a variable pitch propeller. A gas turbine engine governor is configured to hold the gas turbine engine 102 at operating speed. The primary lift fan 150 is commanded to lift and the engine power increases to fulfill the power demand. Power taken from the system is used to balance the airframe actively to maintain proper flight angles of the wings 142, 144. As the pilot commands forward motion, the propeller pitch is increased and as lift occurs the electrical lift system (primary lift fan 150 and balance fans 152, 154, 156, 158) begin to reduce speed. Once cruising speed is established, and wing lift dominates, the balance fans 152, 154, 156, 158 will be commanded to zero speed and can be closed off for improved aerodynamics. The balance fans 152, 154, 156, 158 are used to orient the airframe in accordance with the control system 135 and the pilot commands during lift.

System Operation

Figure 2B:
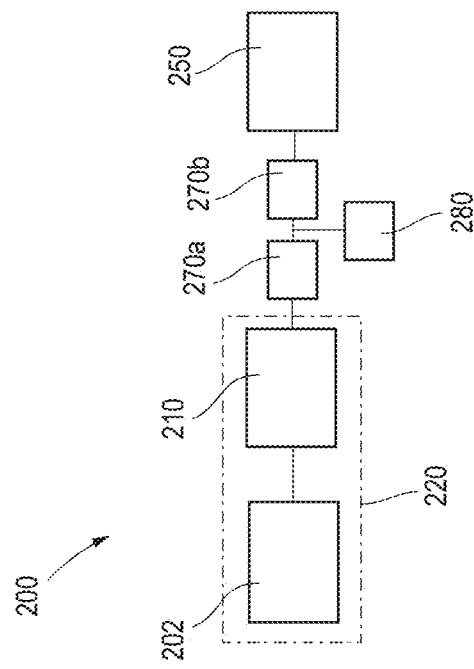
FIG. 2B is an illustration of a series electrical power system for comparison with the power split device of the present disclosure.
Figure 2A:
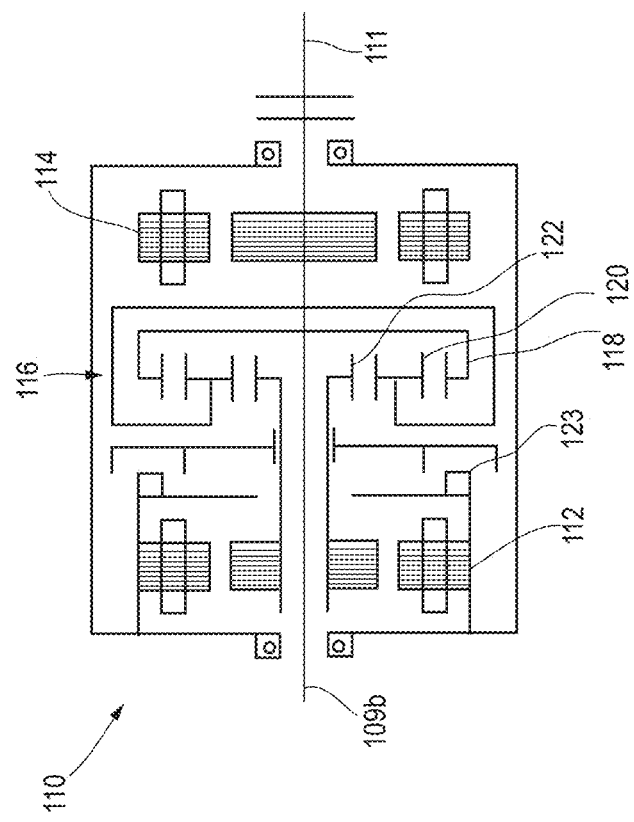
FIG. 2A is an illustration of a power split device of a hybrid power system of the vertical takeoff and landing aircraft system of FIG. 1.
Figure 12:
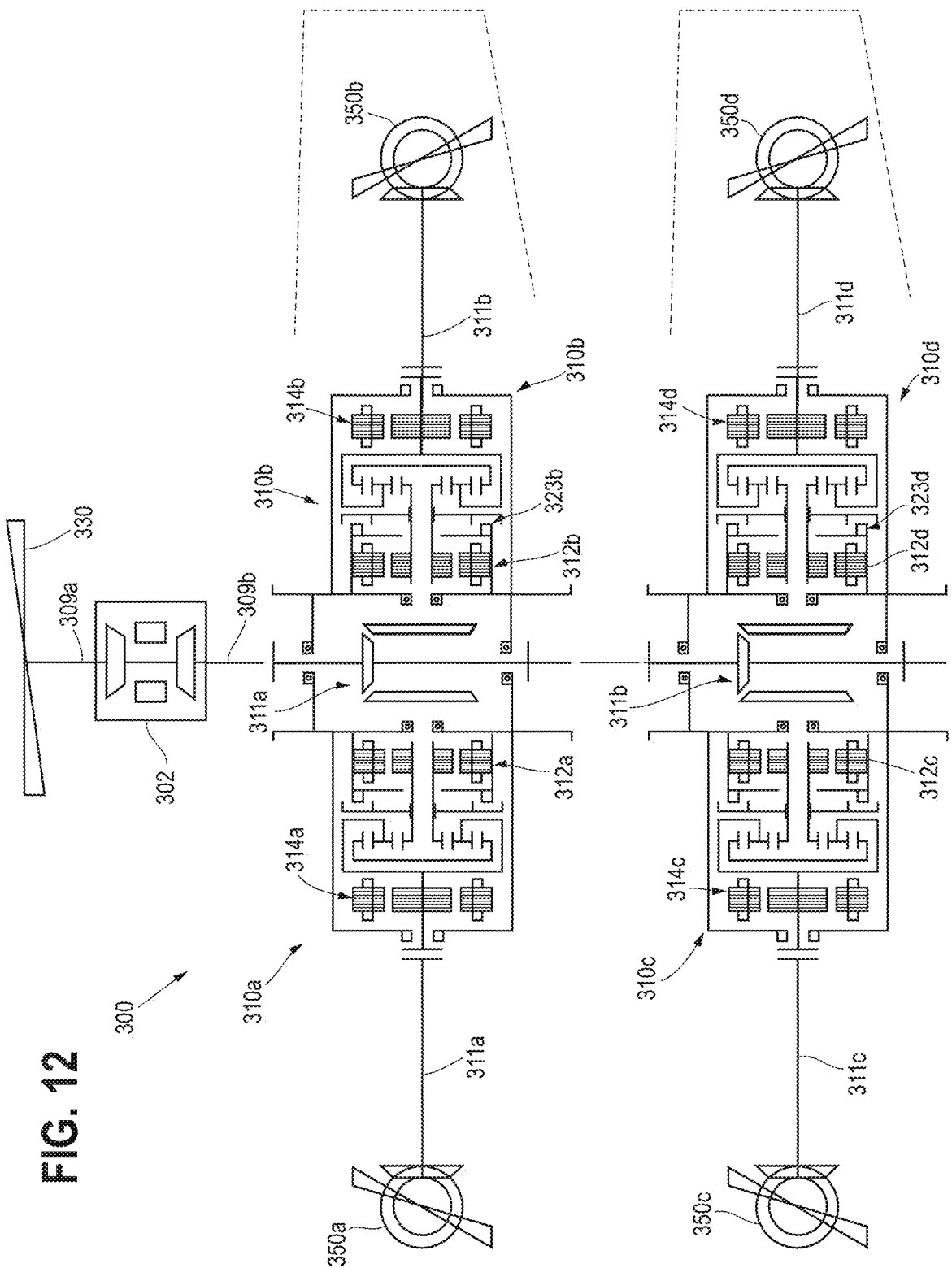
FIG. 12 is an embodiment of a vertical takeoff and landing aircraft system having a quad lift fan architecture.

The power split device 110 shown in FIG. 2A provides infinitely variable fan control and can be duplicated depending on the application as seen in FIG. 12. In operation of embodiments of the aircraft system, it was found the control units (motor generators 112, 114) are much smaller than expected due to power flow conditions involving fans and propellers. The aircraft system 100 is used to uniquely control a fixed primary lift fan 150, provide vectoring of the aircraft via balance fans 152, 154, 156, 158, and transition back to zero electrical as the propeller 130 is feathered. The aircraft system 100 also provides generator power during operation from the motor generators 112, 114 (FIG. 2A). As will be shown, the lift power always flows from input to output, primarily supplied by the gas turbine engine 102, not requiring high-power battery systems, however it may be assisted by batteries supplying the DC bus.

Power from an output shaft 109b (FIG. 2A) of the gas turbine engine 102 enters the power split device 110 and is transmitted to the ring gear 118 of the planetary module 116. The first motor generator 112 (control) is coupled to the sun gear 122 of the planetary module 116, and the second motor generator 114 (output) is coupled to the planet carrier 120 of the planetary module 116.

The first motor generator 112 may colloquially be referred to as the control motor, motor generator 1, or MG1, and the second motor generator 114 may be referred to as the output motor, motor generator 2, or MG2. An optional electromagnetic clutch 123 is also provided. Additional variations of the system configuration depend on speeds which can be much higher in turbine engines, and, arrangement of the planetary connections or type of controlled differential may be changed to accommodate specific power requirements. The system is shown with a simple planetary module, which acts as a variable speed differential. The planetary module is not limited to a simple planetary but any three input gear set intended to operate as a variable differential device, such as but not restricted to a compound dual planet planetary gear set. The gear set selected depends on component design speeds and design requirements.

FIG. 2B illustrates a series electrical system 200 having a gas turbine engine 202, a generator 210 (or a genset 220), an inverter 270a, a rectifier 270b, a lift fan 250, and a battery 280 for comparison with the aircraft system 100. As will be discussed later, the parallel power flow of the hybrid power system of the aircraft system 100 of the present disclosure has a significant efficiency advantage over the series electrical system 200 illustrated in FIG. 2B.

Component Speed

Figure 3:
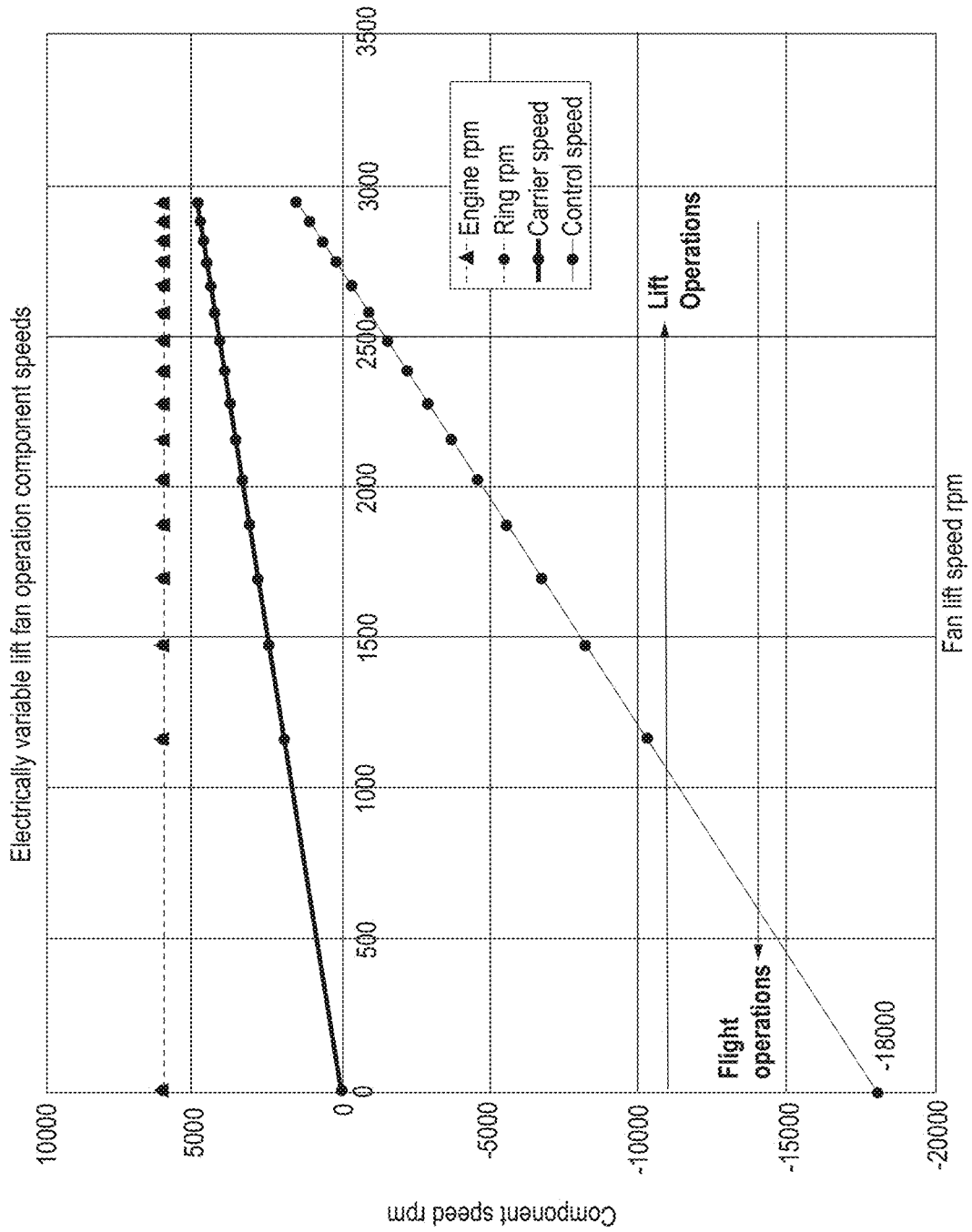
FIG. 3 is an example graphical representation of component speed of the aircraft system during flight operation and lift operation.

The graphical representation of FIG. 3 shows the component speed relationships of the gas turbine engine 102, the ring gear, the planet carrier, and the first motor generator of an embodiment of the aircraft system 100 between lift operation and flight (cruise) operation. Speeds and powers in the following graphical representations are comparisons between the aircraft system of the illustrated embodiment and a series electrical arrangement. In FIG. 3, a constant speed governor at 6000 rpm is used for explanation. In this operation, output speed is determined by the speed set by the control motor (motor generator 1 112). An advantage of this design is the power of the primary lift fan 150 or propeller 130 at zero speed is zero, and the control unit power (first motor generator 112) is nearly zero at zero speed, when the fan reaches 2750 rpm at the lift design point. This provides for high efficiency, as will be shown.

As the gas turbine engine 102 (FIG. 1) achieves its operating speed, the control motor (first motor generator 112) is slowed down, speeding up the primary lift fan 150. This lift increase is infinitely variable and is controlled by the pilot command via the control system 135. Once lift is achieved, the pilot can rotate the aircraft system 100 using balance fans 152, 154, 156, 158 and begin forward motion by change of pitch of the blades of the variable pitch propeller 130. As forward motion causes wing lift, the control motor (first motor generator 112) reduces in speed, the primary lift fan 150 power and speed are reduced to zero, and lift and balance fans shut down as the lift is now being generated by the wings 142, 144 and the variable pitch propeller 130, providing very high efficiency.

Component Power Distribution

Figure 4:
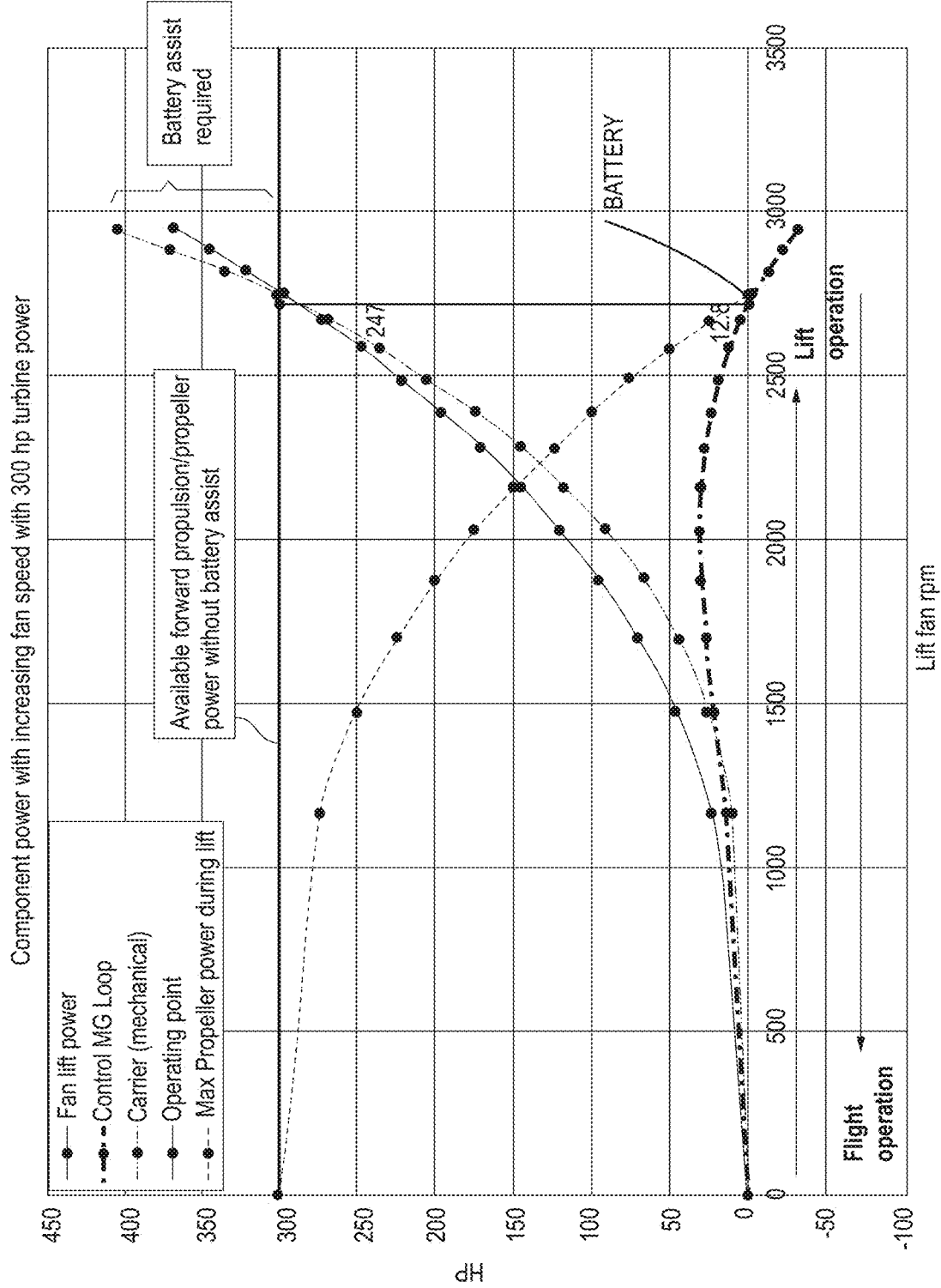
FIG. 4 is an example graphical representation of power distribution of the aircraft lift system components during flight operation and lift operation.

The graphical representation of FIG. 4 illustrates the power distribution in an example illustrated embodiment having a 300 horsepower (hp) gas turbine engine between lift operation and flight operation (without battery assist or accessory loads). The primary lift fan 150 power increases slowly resulting in low power through the speed control components. As the primary lift fan speed increases, the control loop power (first motor generator 112) increases to 31 hp (approximately a 10:1 ratio) and reduces as the speed drops. When the first motor generator 112 (the control motor) transitions to zero speed, all gas turbine engine 102 power is mechanically driving the primary lift fan 150 at a very high efficiency with minimal electrical load. In this example, the control motor 112 is acting as a non-contact electromagnetic clutch, and an optional electromagnetic clutch 123 may selectively be added to drop all electrical if desired. The mechanical efficiency is much higher than the electrical loop, so electrical losses are significantly reduced. As the lift operation passes the operating point (FIG. 4), battery 180 power is used to provide power assist to the primary lift fan 150, if the lift power exceeds engine power.

Heat Loss Comparison to an Electric Driven Fan System

Figure 5:
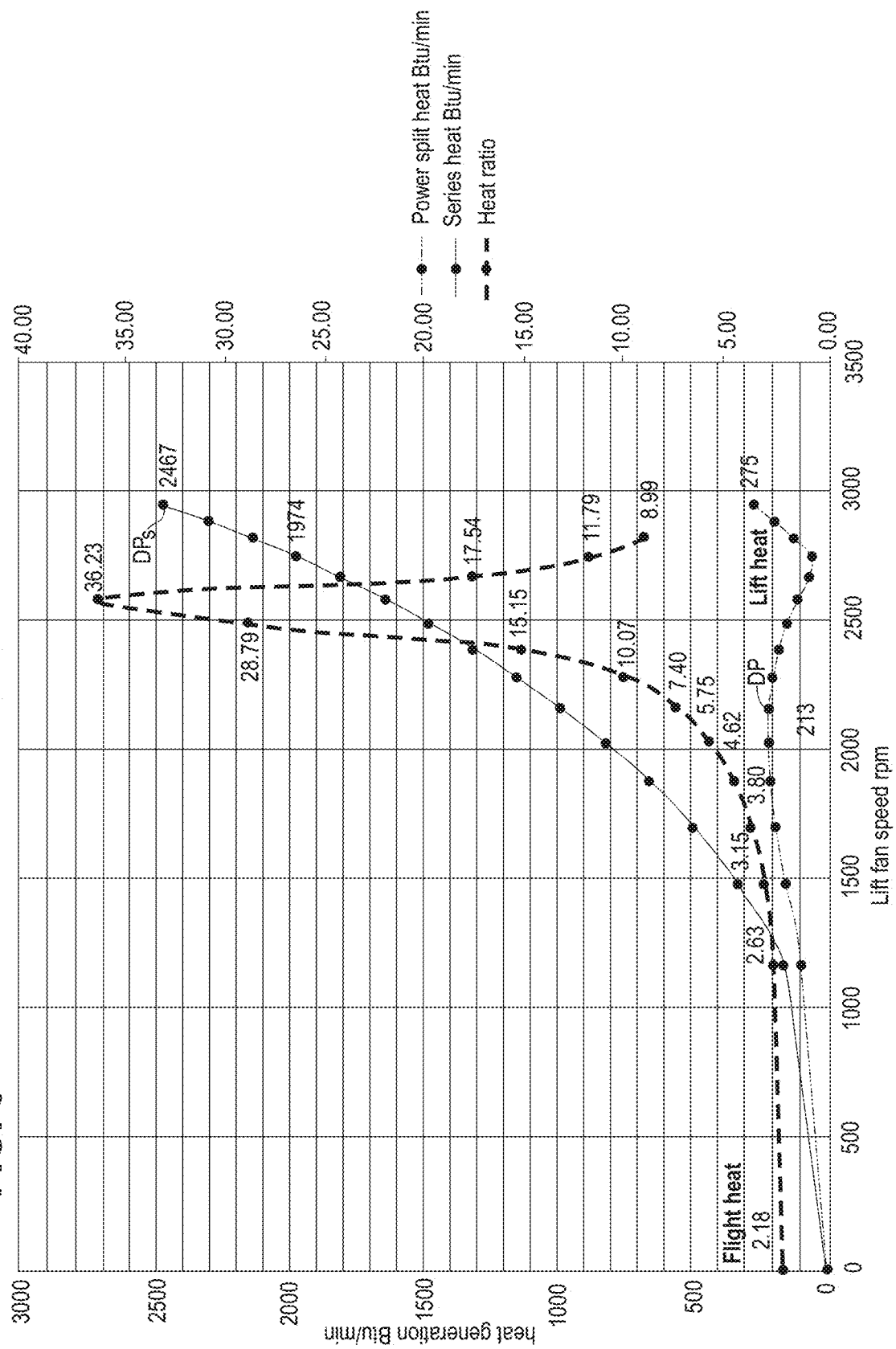
FIG. 5 is an example graphical representation of heat generation of the aircraft system and the comparative series electrical system of FIG. 2B.

The graphical representation of FIG. 5 shows comparison of the aircraft system and a series electrical system with the same input power. The hybrid power system of the current disclosure is shown as "Power split heat." A series electrical system (e.g., FIG. 2B) for comparison is shown as "Series heat." The power lost to heat by a pure electric system continues to rise to 2,467 Btu/min as inverters and motor losses rise with power being transferred. In comparison, the power split control loop heat peaks at about 2,000 rpm (at 213 Btu/min) and at about 2,900 rpm (past the operating point). The comparison of the series design point (DPs) and the power split design point (DP) illustrates a cooling savings which is a significant improvement of 11.6:1 (DPs/DP=2467/213=11.6). The aircraft system shown in FIG. 1, the losses of the fan are transient, lifting the airframe and then dropping back to zero, with a very low heat generation profile. The heat ratio of FIG. 5 shows the series heat generation of the series electrical system is approximately 36 times the heat generation of the power split (parallel) system at the max lift design point of approximately 2,550 rpm. In operation, pure electric (series) systems (see FIG. 2B) will have to maintain cooling to deal with the rapid rise in heat generation during flight adding cost and weight to such a system. The heat problem with series also continues to increase above max lift design point whereas the parallel system heat is still within the 2000 rpm heat generation limits.

Lift Efficiency

Figure 6:
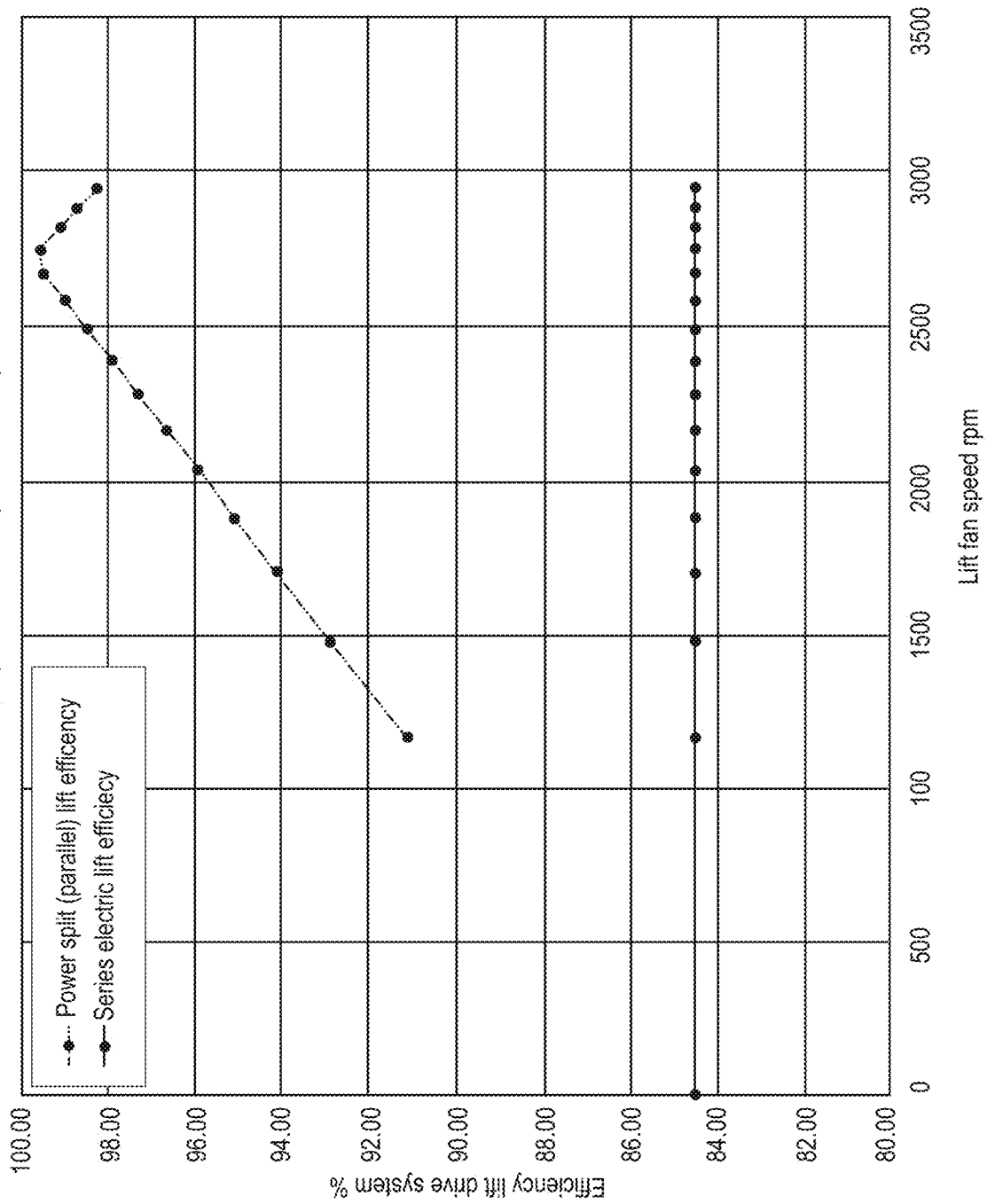
FIG. 6 is an example graphical representation of efficiency of the aircraft system and the comparative series electrical system of FIG. 2B.

The aircraft system 100 transmits the majority of power through the mechanical path by design. This results in an efficiency exceeding 99% at cruise (a primarily horizontal operating condition). The graphical representation of FIG. 6 illustrates a comparison lift system drive efficiency between a series electrical system, which may reach up to 84.9%, and a power split (parallel) system which can exceed 99%. FIG. 6 illustrates a rapid rise in the power split (parallel) lift efficiency, between 1200 rpm and 2750 rpm, in comparison to the series electric lift efficiency, which does not increase above 85%. The series electric lift efficiency suffers from the poor efficiencies of generators and inverters (FIG. 2B), which are approximately 95% and 97%, respectively.

Effect of Power Offtake

Figure 7B:
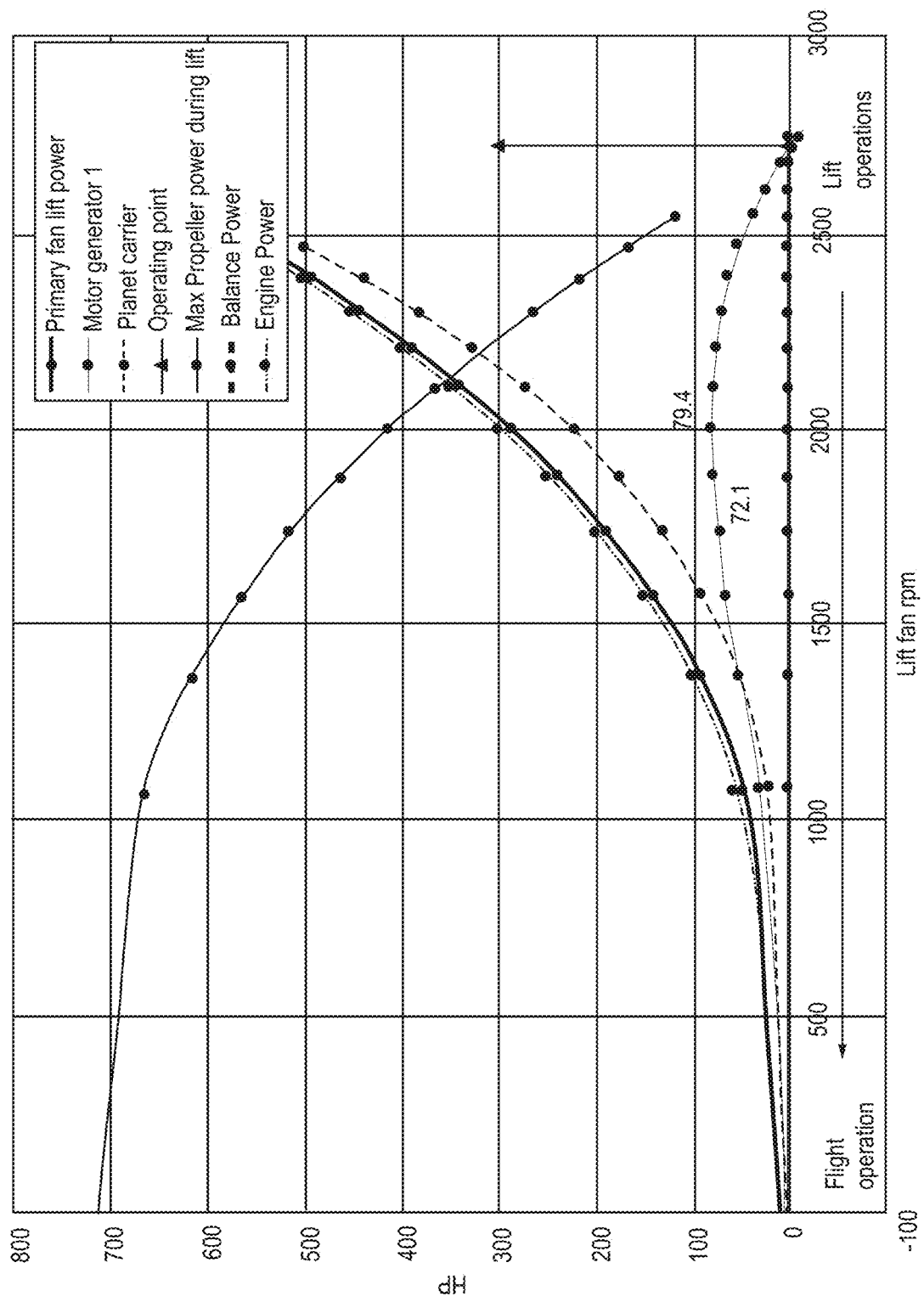

Taking power off the control loop for balance fans 152, 154, 156, 158, is a "node" (DC bus 182) between the two motor generators (see FIG. 1). In the graphical representation FIG. 7A, a 715 hp gas turbine engine with 50 hp balance offtake for aircraft accessories or balance does increase control motor generator size but not as much as would have been expected. The graphical representation FIG. 7B illustrates a 715 hp engine with offtake control motor generators increased in size from 79 to 92 hp (60 kW to 69 kW). Balance demands may result in sizing of the system or the need of a battery 180 system. Note that power offtake can occur from either motor generator 1 or 2 or the system battery since all three are connected to the DC bus. Various operational conditions will determine the power requirements for each device. For instance, operating above the design point, MG2 will be a generator and MG1 is a motor, therefore, MG2 would supply power offtake.

Power Flow

FIGS. 8-11 illustrate example embodiments of power flow of an aircraft system having a 700 hp gas turbine engine 102 driving the power split device 110 corresponding to the schematic in FIG. 1 with a lift fan 150 of 750 hp at 2750 rpm. FIGS. 8-11 show power flow through the control loop 117 (electrical) and planetary module 116 (mechanical), and adding back together at the output shaft 111 (driving the primary lift fan 150). Control loop 117 power flow in the illustrated embodiments of FIGS. 8-11 travels between MG1 112 and MG2 114 through inverters 170a, 170b and through the DC bus 182. The direction of the control loop 117 power flow is indicated by arrows in the figures.

Figure 8:
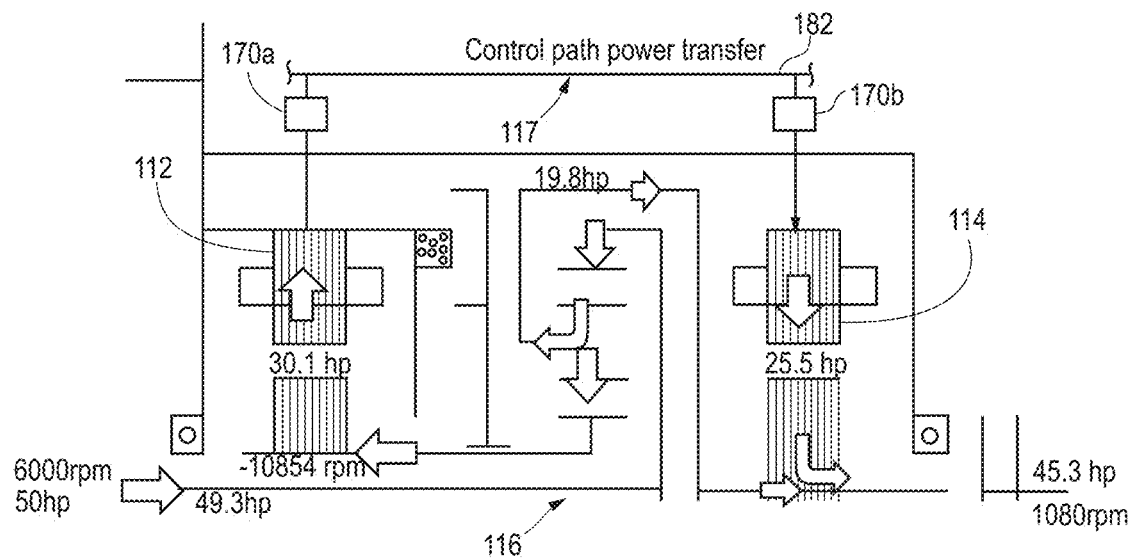
FIG. 8 is a first diagram showing power flow through a control loop and planetary module of an embodiment of the power split device.

FIG. 8 illustrates power flow having an input of 50 hp with zero balance power. The parallel efficiency is 90.8% and heat generation is 198 Btu/min. The series efficiency is 84.5% and heat generation is 329 Btu/min. The majority of power (30.1 hp) is transmitted through the control path power transfer 117 (through the sun gear of the planetary module 116 and the first motor generator 112) rather than the mechanical path (planet carrier of the planetary module 116).

Figure 9:
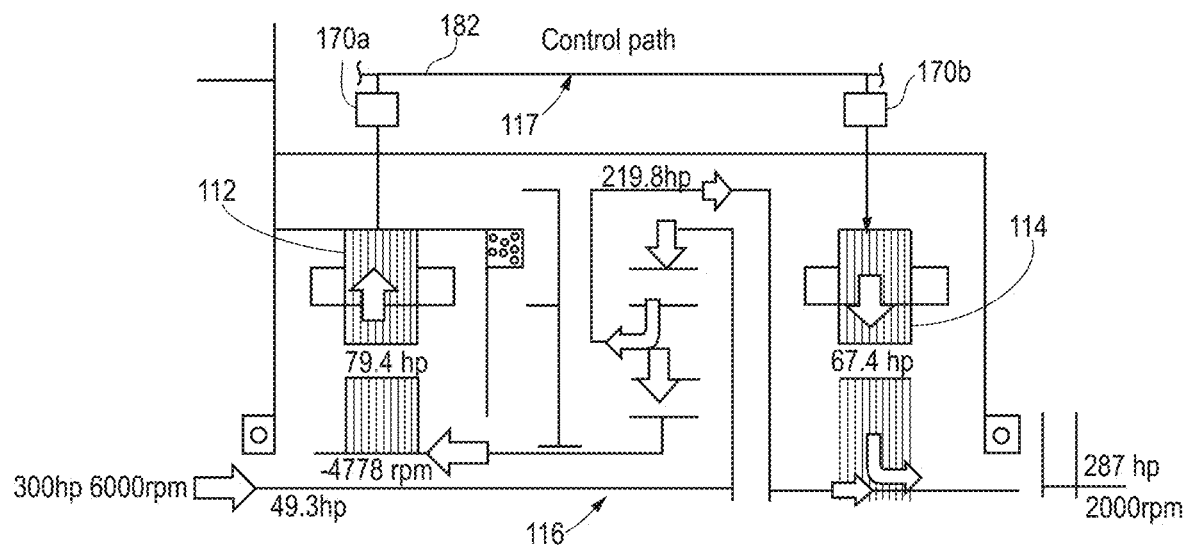
FIG. 9 is a second diagram showing power flow through the control loop and planetary module of an embodiment of the power split device.

FIG. 9 illustrates power flow having an input of 300 hp at a maximum control power point. The parallel efficiency is 95.8% and heat generation is 540 Btu/min. The series efficiency is 84.5% and heat generation is 1974 Btu/min. The majority of power (219.8 hp) is transmitted through the mechanical pathway (planet carrier of the planetary module 116) rather than through the control path 117.

Figure 10:
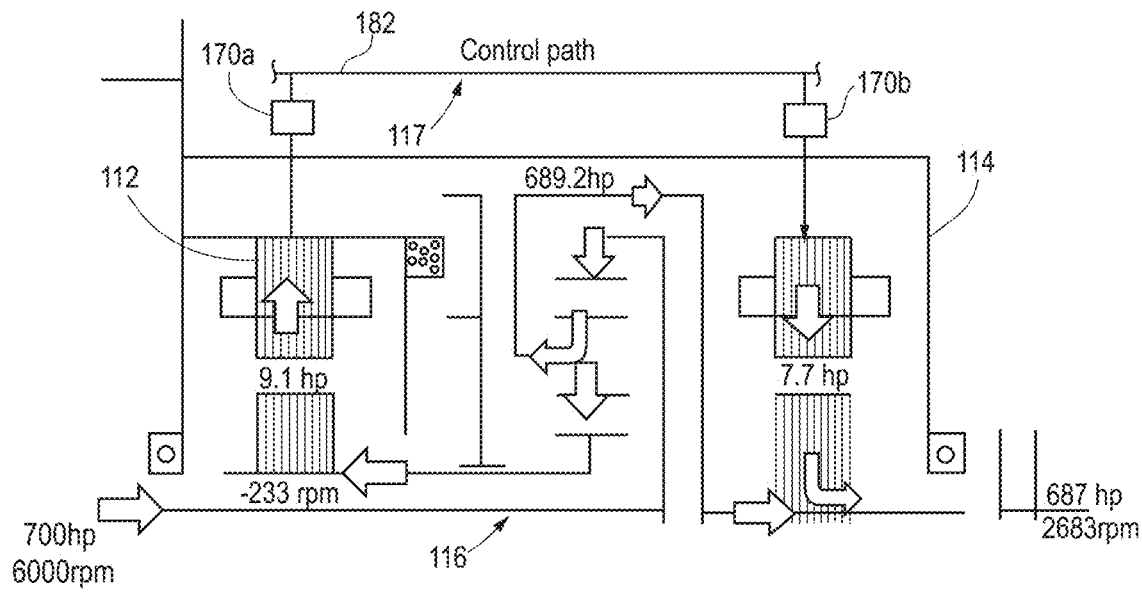
FIG. 10 is a third diagram showing power flow through the control loop and planetary module of an embodiment of the power split device.

FIG. 10 illustrates power flow having an input of 700 hp near max lift with MG1 approaching zero speed, which is the max efficiency point (see FIG. 6). The parallel efficiency is 99.55% and heat generation is 132 Btu/min. The series efficiency is 84.5% and heat generation is 4605 Btu/min. The vast majority of power (689.2 hp) is transmitted through the mechanical pathway (planet carrier of the planetary module 116) rather than through the control path 117. Note that no battery power was required however it could be used to begin assisting to aid in transition to forward propulsion with the propeller.

Figure 11:
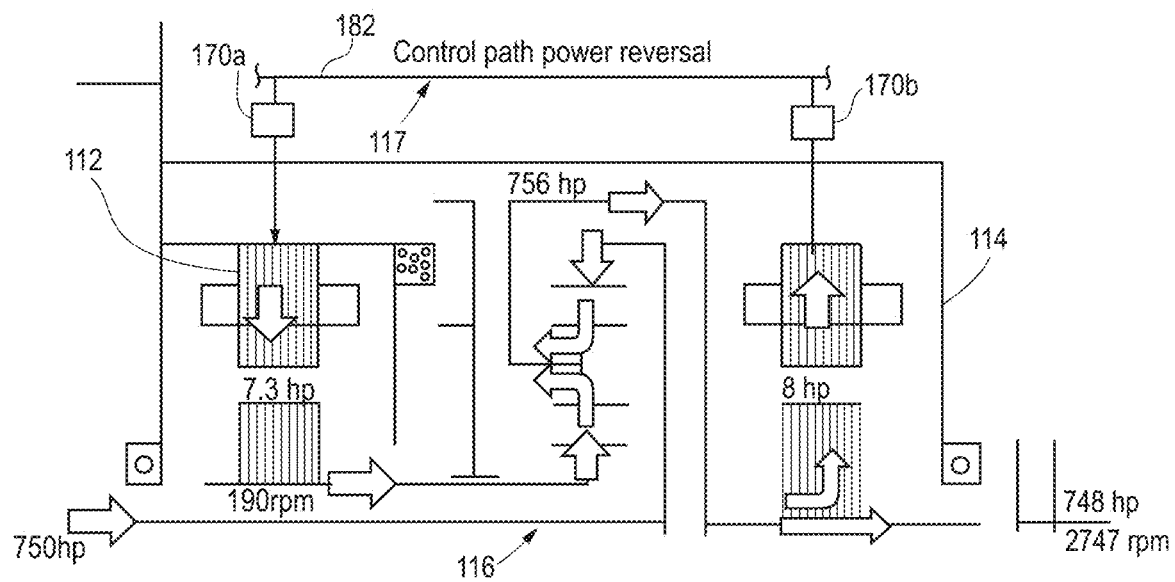
FIG. 11 is a fourth diagram showing power flow through the control loop and planetary module of an embodiment of the power split device.

FIG. 11 illustrates power flow with a 700 hp engine past the operating point in which additional power can be added from storage (see FIG. 4). Parallel efficiency is 99.75% and heat generation is 79 Btu/min. The series efficiency is 84.5% and heat generation is 4934 Btu/min. Note that there is a change in direction of the control power path in FIG. 11 from the second motor generator 114 to the first motor generator 112 such that small amount of power flows from the second motor generator 114 to the first motor generator 112 and drives the sun gear of the planetary module 116. This causes the internal flow of power (756 hp) to exceed engine power as power is circulated through the electro-mechanical pathway (planet carrier of the planetary module 116) rather than the control path 117. This results in increase in heat and loss of efficiency and purposely was set above the design point.

Parallel Architectures

Figure 13:
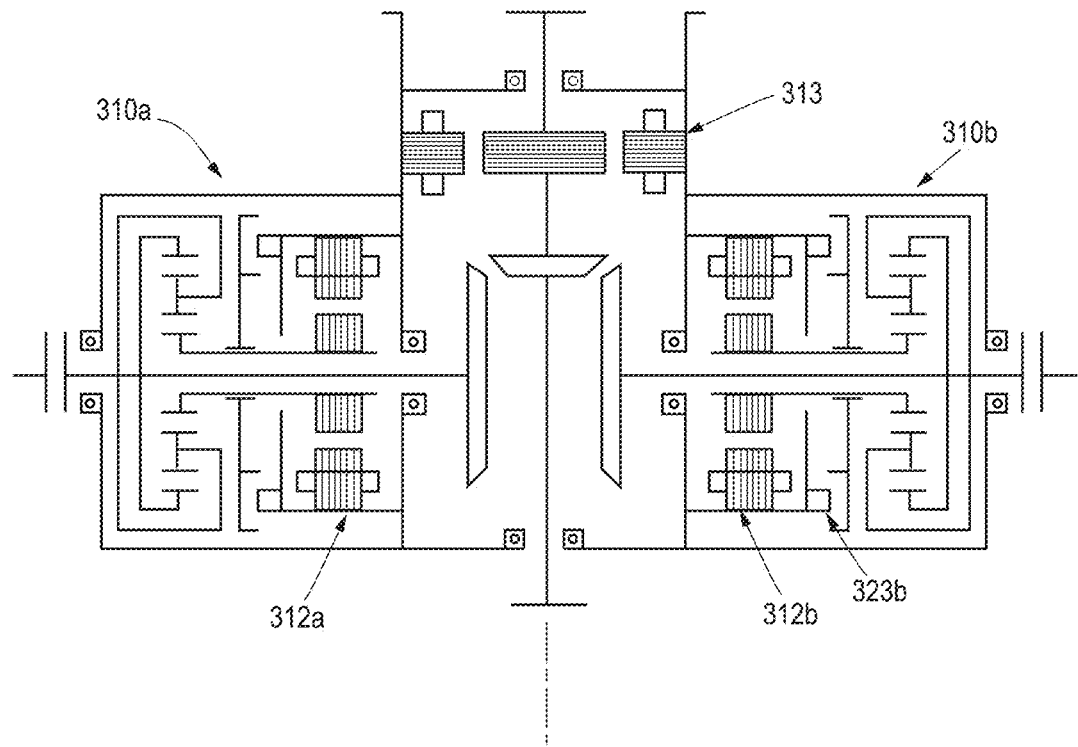
FIG. 13 is a detailed view of an embodiment of the vertical takeoff and landing aircraft system having a quad lift fan architecture having an electronic differential.
Figure 14:
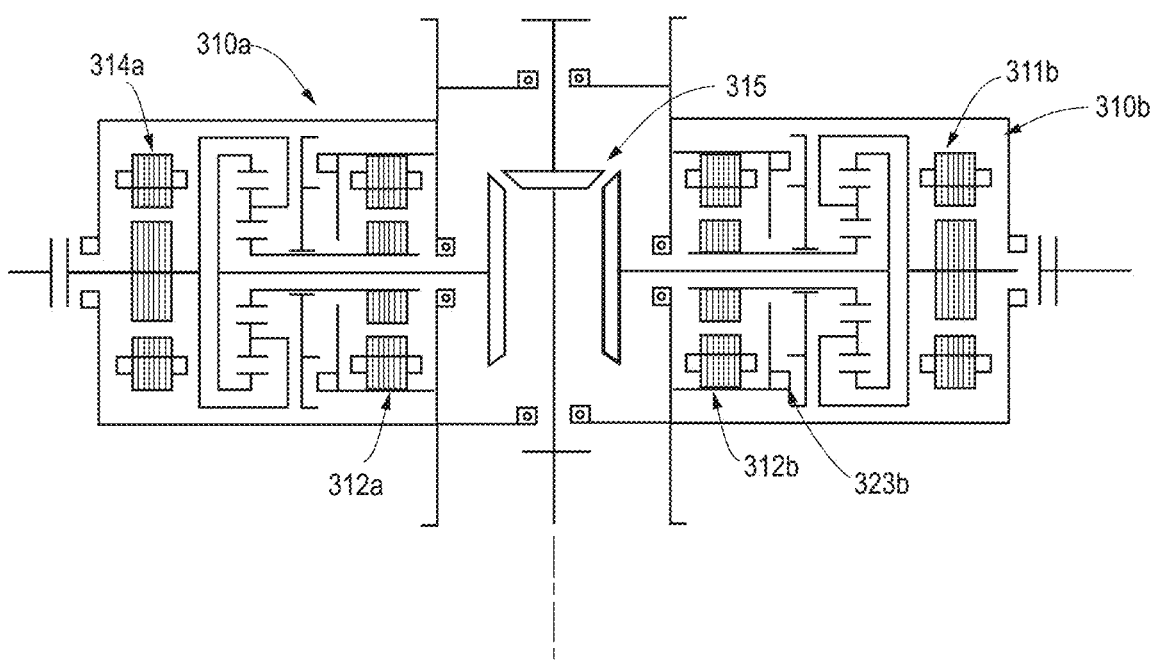
FIG. 14 is a detailed view of an embodiment of the vertical takeoff and landing aircraft system having a quad lift fan architecture having a mechanical differential.

The power split device 110 of FIG. 1 can be expanded to multiple drive configurations. FIG. 12 shows an aircraft system 300 that comprises a first output shaft 309a coupled to a variable pitch propeller 330 and differentials 311a, 311b on the second output shaft 309b of the gas turbine engine 302. Four balance/lift fans 350a-350d are provided on output shafts of four power split devices 310a-310d. All units are controlled efficiently, yet the majority of the power is transmitted mechanically. In this example embodiment, eight small motor generators are employed (312a-312d, 314a-314d). The gas turbine engine 302 is 300 hp and each of the eight motor generators is a 7.5 hp motor and requires 7.5 hp for control. A comparison electric quad similar system would require a 300 hp generator driving four 75 hp fan systems and only deliver 85% of engine power for flight. FIGS. 13 and 14 show a dual fan electrically controlled differential module 313 and mechanical differential 315, respectively. FIG. 15 illustrates electronic differential distribution power transfer 317 between adjacent motor generators 312b, 312a during balance control. Power from one control module (first motor generator 312b of power split device 310b) is transmitted to first motor generator 312a of power split device 310a for example or to motor generators of the other power split devices (not shown). This power transfer 317 of the aircraft system provides system redundancy.

Figure 16:
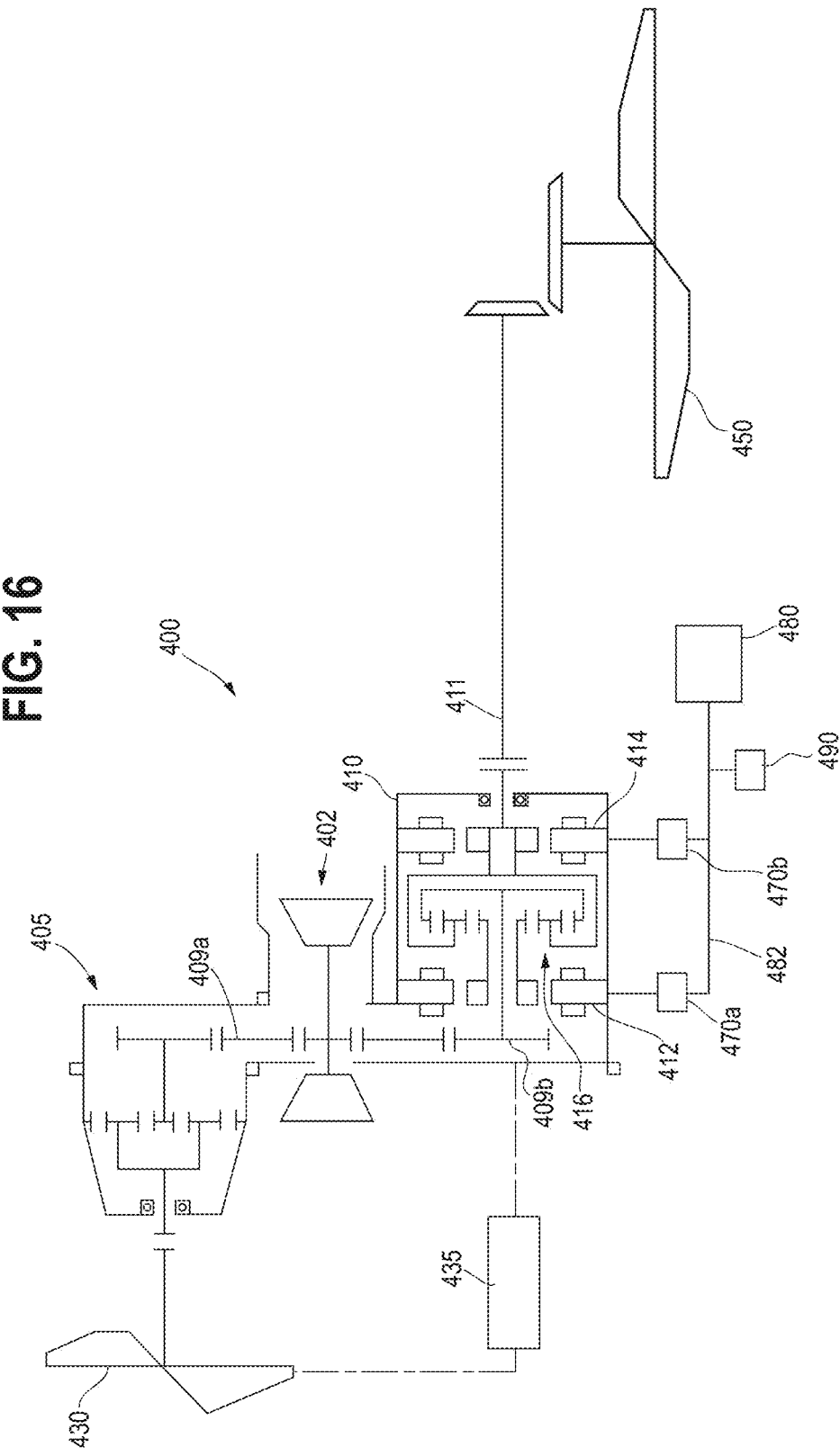
FIG. 16 is an overview of an embodiment of the vertical takeoff and landing aircraft system having an integrated architecture.

FIG. 16 provides a schematic illustrating a fully integrated aircraft system 400, which uses a single core gas turbine engine 402 for low cost. For example, the gas turbine engine 402 may be a Rolls-Royce M250 turboshaft engine. For simplicity, the schematics are shown with a single core engine.

A first output shaft 409a is coupled to a speed reduction 405 to a variable pitch propeller 430, and a second output shaft 409b is coupled to a power split device 410 (integrated variable fan drive unit), which is purposely dropped low to position the power split device 410 in line with the primary lift fan 450. The output shaft 411 of the power split device 410 drives the primary lift fan 450. Utilization of an efficient, low cost engine results in an aircraft system that provides vertical lift and is affordable.

The motor generators 412, 414 (FIG. 16) and planetary module 416 of the power split device 410 are used for electrical power generation and starting (single core engines). Fuel system and oil pump drives (not shown) connect to the gear drive system as known to those of ordinary skill in the art. Further, the aircraft system 400 in this example embodiment includes inverters 470a-470b, a DC bus 482, a battery 480, and auxiliary power 490.

Figure 17:
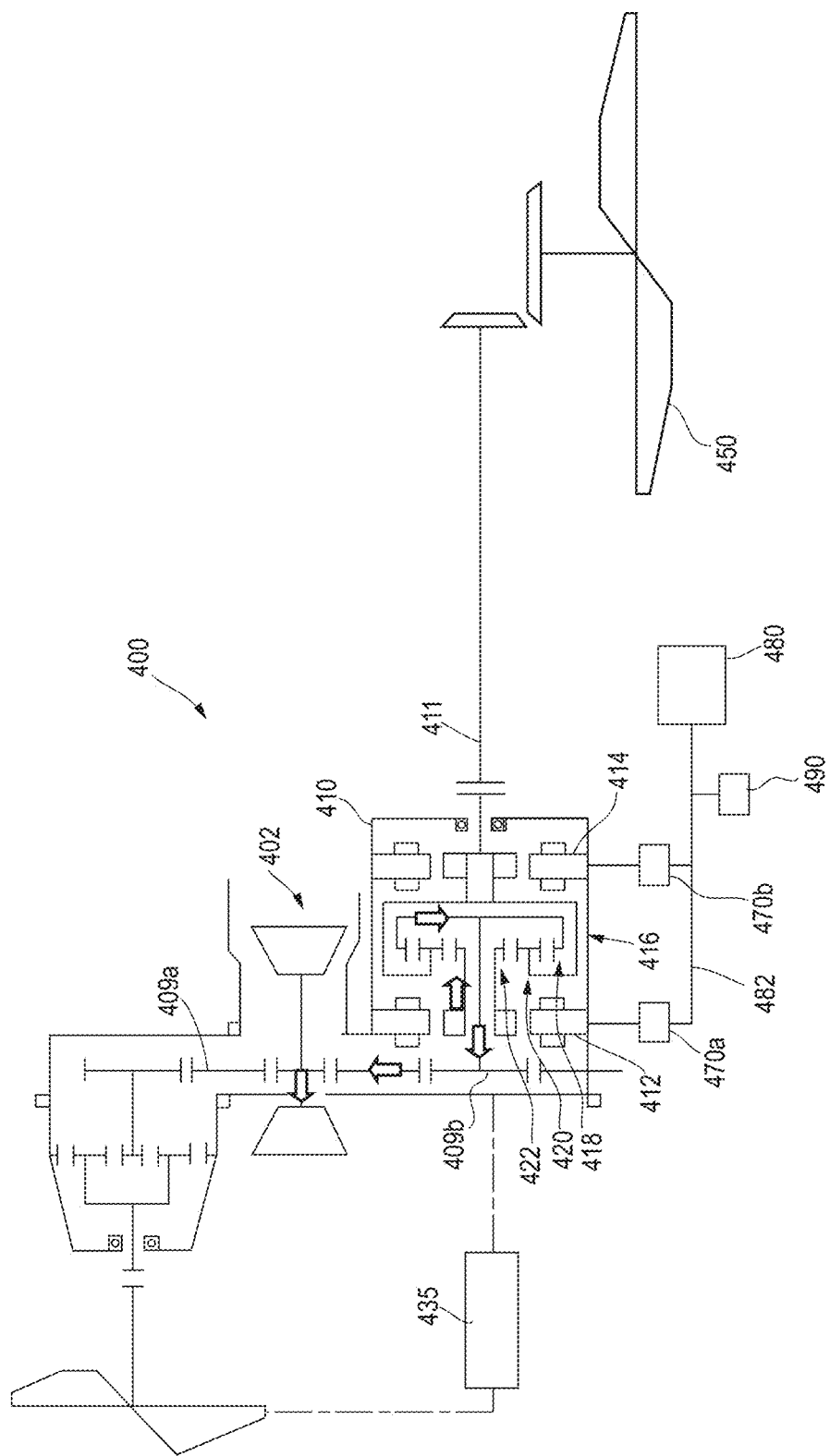
FIG. 17 is an overview of the embodiment of the vertical takeoff and landing aircraft system having an integrated architecture of FIG. 16 showing power flow at start of a single core gas turbine engine.

FIG. 17 shows power flow conditions using the power split device 410 to start the single core gas turbine engine 402 without additional hardware. The second motor generator 414 is coupled to the planet carrier 420 and is held at zero speed, operating as an electromagnetic clutch to provide a planetary reaction. The first motor generator 412 is coupled to the sun gear 422 and provides power to drive the second output shaft 409b of the single core gas turbine engine 402, which is coupled to the ring gear 418.

The aircraft system 400 shown in FIG. 17 comprises a gas turbine engine 402 coupled to a variable pitch propeller 430. This aircraft system 400 also works with turbo-jet or turbo-fan applications to shorten takeoff requirements. The aircraft system can work in conjunction with structures that affect orientation via balance fans or control of the exhaust vectors.

Power Offtake

Either control motor/generator can provide power for aircraft auxiliary power 190 loads, or accept power for lift assist. The size can be increased as necessary depending on the assist, aircraft loads, and transient requirements.

In summary, the aircraft system as described herein provides a highly efficient light personal aircraft, using hybrid power, including gas turbine engine 102 power and small electrical motor generators. Control path power transfer and battery power connected to the first and second motor generators 112, 114 provides for important flexibility.

Integration of the aircraft system with an existing airframe provides advantages such as high efficiency, reduction in electrical power, and weight. The cost is reduced with reduced battery, motor, and power electronics requirements. The aircraft system can be provided to the air frame manufacturer ready to drive a propeller and fan system of choice.

New aircraft being designed for vertical lift using electric motors suffer from weight, high heat losses, and normal flight efficiency loss of the electric system. The scaling up of motors for quad architectures and other concepts results in very large power systems. The illustrated aircraft system addresses these problems. The aircraft system includes a hybrid power system having a power split device primarily driven by a gas turbine engine. The aircraft system described herein reduces required motor generator power by as much as 10× and heat generation by as much as 10×, and further reduces battery demand. In some embodiments, a lift fan control module 435 and power split device 410 can be added to an existing aircraft, for a hybrid retrofit, or incorporated into a new aircraft design. The advantages of reduced weight, reduced heat, efficiency gains of 12% or more over electric, and lift fan operation only during lift and landing further improve efficiency and system reliability during normal flight operation.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

I claim:

1. A vertical takeoff and landing aircraft system, comprising:
   a fuselage comprising a gas turbine engine, the gas turbine engine having a compressor, a combustor, a turbine, a first output shaft, and a second output shaft;
   a plurality of wings extending outwardly from the fuselage;
   a variable pitch propeller coupled to the first output shaft of the gas turbine engine;
   a power split device coupled to the second output shaft of the gas turbine engine, the power split device comprising a planetary module, a first motor generator, and a second motor generator, wherein an operational state of the second motor generator mechanically controls an amount of power transferred to the first motor generator, the planetary module comprising a sun gear, a ring gear, and a planet carrier, wherein the first motor generator of the power split device is coupled to the sun gear, wherein the second motor generator of the power split device is coupled to the planet carrier and the second output shaft of the gas turbine engine is coupled to the ring gear;
   a primary lift fan mechanically coupled to an output shaft of the power split device; and
   a plurality of balance fans configured to operate using electrical energy generated by the power split device.

2. The aircraft system of claim 1, wherein the first motor generator and the second motor generator of the power split device are coupled to a first inverter and a second inverter respectively, wherein the first inverter and the second inverter are coupled to a DC bus and a battery pack, and wherein the battery pack is configured to power the plurality of balance fans.

3. The aircraft system of claim 2, wherein the plurality of balance fans are configured to be utilized during vertical lift and closed off during cruising.

4. The aircraft system of claim 3, wherein one of the plurality of balance fans is disposed in each of the plurality of wings of the fuselage.

5. The aircraft system of claim 2, wherein the battery pack coupled to the DC bus is configured to provide auxiliary power to the aircraft system.

6. A method of operating a vertical takeoff and landing aircraft system, the method comprising:
   running a gas turbine engine, the gas turbine engine disposed in a fuselage of the aircraft system, and wherein a plurality of wings extend outwardly from the fuselage;
   operating a variable pitch propeller coupled to an output shaft of the gas turbine engine;
   operating a power split device coupled to the gas turbine engine, the power split device comprising a first motor generator, a second motor generator, and a planetary module therebetween, wherein operating the power split device comprises controlling the second motor generator to mechanically control an amount of power transferred to the first motor generator by coupling the first motor generator of the power split device to a sun gear of the planetary module, coupling the second motor generator of the power split device to a planet carrier of the planetary module, and coupling a second output shaft of the gas turbine engine to a ring gear of the planetary module;
   operating a plurality of balance fans using electrical energy generated by the power split device; and
   operating a primary lift fan mechanically coupled to an output shaft of the power split device to lift the aircraft system vertically.

7. The method of claim 6, further comprising the step of charging a battery, wherein the battery is coupled to a DC bus, and the DC bus is coupled to:
   a first inverter, which is coupled to the first motor generator of the power split device; and
   a second inverter, which is coupled to the second motor generator of the power split device.

8. The method of claim 7, wherein at least one of the plurality of balance fans is disposed in each of the plurality of wings of the aircraft system.

9. The method of claim 8, further comprising the step of opening louvers disposed above and below each of the plurality of balance fans prior to vertical lift.

10. The method of claim 9, further comprising the step of closing the louvers disposed above and below each of the plurality of balance fans after vertical lift.

11. The method of claim 8, further comprising the step of powering the plurality of balance fans using the battery.

12. An aircraft system comprising:
a fuselage comprising a single core gas turbine engine, two wings extending outwardly from the fuselage, and a tail section comprising horizontal stabilizers;
a variable pitch propeller coupled to a first output shaft of the single core gas turbine engine;
a power split device coupled to a second output shaft of the single core gas turbine engine, the power split device comprising a primary motor generator, a secondary motor generator, and a planetary module there between, wherein an operational state of the secondary motor generator mechanically controls an amount of power transferred to the primary motor generator, the planetary module comprising a sun gear, a ring gear, and a planet carrier, wherein the primary motor generator of the power split device is coupled to the sun gear, wherein the secondary motor generator of the power split device is coupled to the planet carrier and the second output shaft of the gas turbine engine is coupled to the ring gear;
a primary lift fan configured to lift the aircraft system vertically, wherein the primary lift fan is mechanically coupled to an output shaft of the power split device; and
a plurality of balance fans configured to operate using electrical energy generated by the power split device.

13. The aircraft system of claim 12, further comprising a secondary lift fan coupled to a secondary power split device.

14. The aircraft system of claim 13, wherein a differential is disposed on the second output shaft of the single core gas turbine engine, and wherein the power split device and the second power split device are coupled to the differential.

15. The aircraft system of claim 12, wherein a speed drop gear is disposed between the variable pitch propeller and the single core gas turbine engine.

16. The aircraft system of claim 14, wherein a third power split device and a fourth power split device are coupled to the second output shaft of the single core gas turbine engine, and wherein the third power split device and fourth power split device are coupled to a tertiary lift fan and a quaternary lift fan, respectively.

17. The aircraft system of claim 12, further comprising a DC bus coupled to a battery.

18. The aircraft system of claim 17, wherein the primary motor generator is coupled to a first inverter and the secondary motor generator is coupled to a second inverter, and wherein the first inverter and the second inverter are coupled to the DC bus.

* * * * *